INVENTORS
Gerald F. Van Ausdal
Lyle R. Gordon
Elgin J. Karklins
BY Albert N. Reuther
Their Attorney INVENTORS
Gerald F. Van Ausdal
Lyle R. Gordon
Elgin J. Karklins
BY Albert H Reuther
Their Attorney INVENTORS
Gerald F. Van Ausdal
Lyle R. Gordon
Elgin J. Karklins
Their Attorney

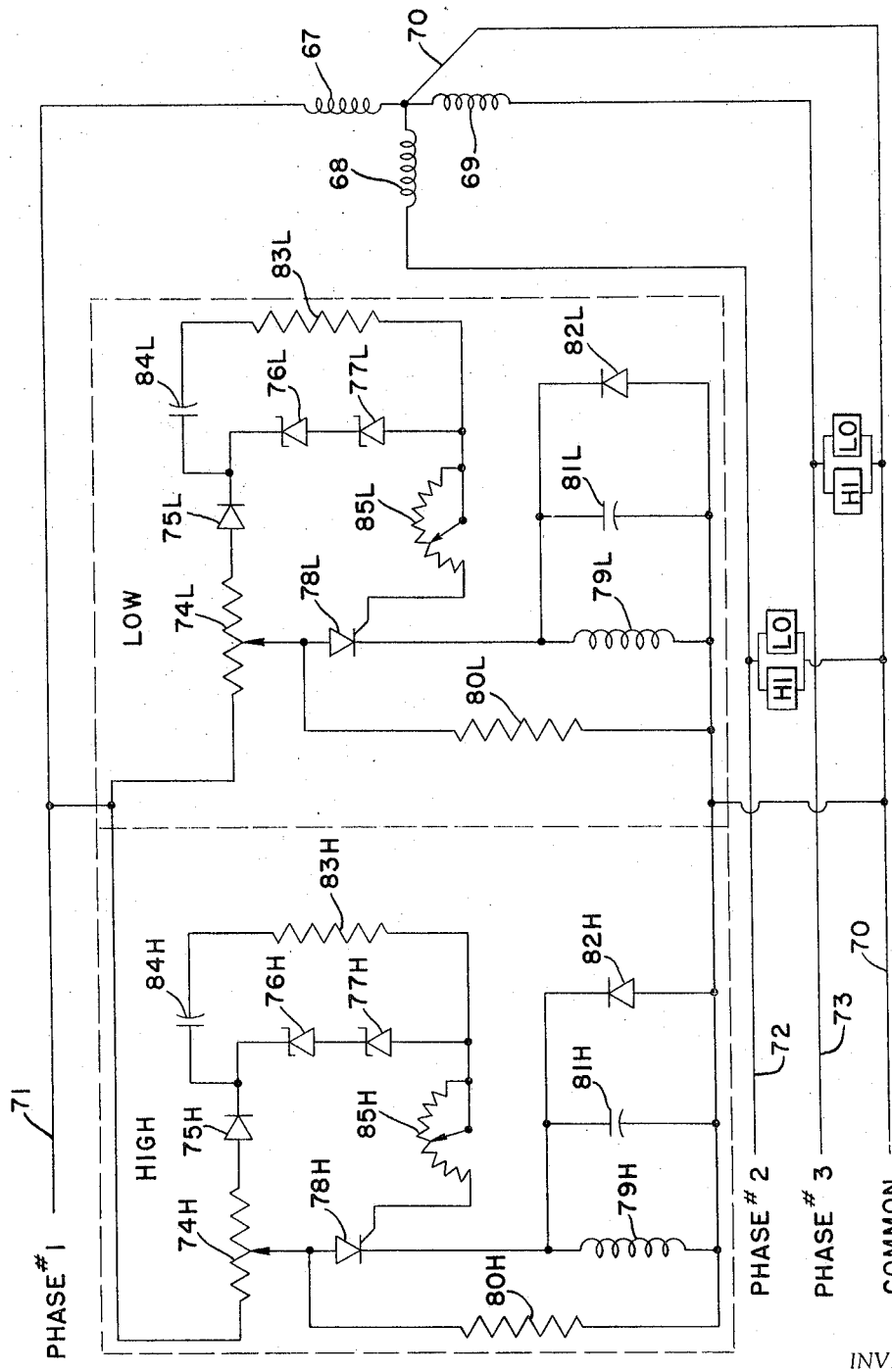

United States Patent Office 3,296,451
Patented Jan. 3, 1967

3,296,451
ALTERNATOR CONTROL IN A STANDBY POWER SYSTEM
Gerald F. Van Ausdal, Lyle R. Gordon, and Elgin J. Karklins, Dayton, Ohio, assignors to General Motors Corporation, Detroit, Mich., a corporation of Delaware
Filed Nov. 15, 1963, Ser. No. 324,123
9 Claims. (Cl. 290—4)

This invention relates to "no-break" powering systems, and particularly to use of a special feature in an excitation system of generator means used as a synchronous motor to drive another generator.

There are several varieties of "no-break" power systems with varying degrees of complexity. All varieties include a huge flywheel which keeps an electrical machine operating as a generator in rotation until a diesel or internal combustion engine operating through a clutch can be brought up to speed. In such an application, the generator supplying electrical power would be driven by another generator running as a synchronous motor from a utility power line and with shafts coupled together to the flywheel. One problem encountered in the past with synchronous motor drivers was that of disconnecting them from the supply line when the utility power failed, especially due to shorted incoming lines. In a brief interval generally required to open a circuit breaker, a normally excited synchronous driver would force large currents through the short-circuited utility line. This results in absorption of power from the flywheel and accordingly in excessive reduction of speed thereof. Frequency of the system then drops below a minimum specification of substantially fifty-eight cycles per second.

Therefore, as an object of the present invention, a special feature of dual exciters supplying a dual alternator field means can be provided in accordance with the present invention.

Another object of this invention is to have one of the dual exciters for a dual alternator field means supply a more-than-adequate supply of current to the alternator field as long as the utility line is supplying power through rectifiers to its exciter field while the second exciter supplies a "bucking" current to another portion of the alternator field. Excitation of the second exciter is then supplied by a current transformer means in one of the incoming utility lines so that normal full-load current supplies only a small amount of "bucking" current. However, a larger short-circuit current, as noted previously during failure of the power line, causes a larger increase in excitation to the field of this second exciter, thereby providing a larger "bucking" current to the field of the driver, almost instantaneously reducing its magnetic flux field so that it no longer generates currents back into the power line. Thus, energy loss for generating such currents is reduced to a minimum and the flywheel is free of previous loss of speed.

Further objects and advantages will become apparent from the following description, reference being had to the drawings wherein preferred embodiments of the present invention are clearly shown.

In the drawings:

FIGURE 7 shows high-low phase sentinel protective circuitry herewith.

Figure 1:
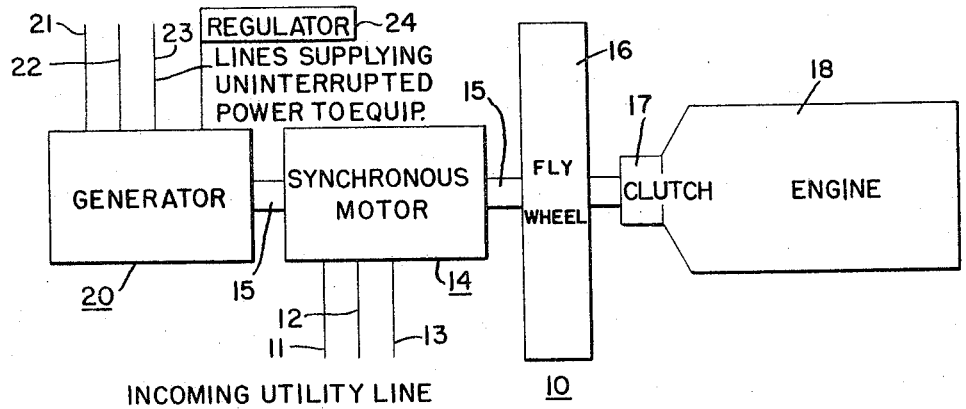
FIGURE 1 is a block diagram of a "no-break" system to be equipped in accordance with the present invention.

In FIGURE 1 there is shown a block diagram of a "no-break" system generally indicated by numeral 10 having first, second and third incoming utility lines identified by reference numerals 11, 12 and 13, respectively, for energization of a synchronous motor means generally indicated by numeral 14. So long as incoming electrical energization is being properly supplied, this motor means 14 continues to effect rotation of a shaft 15 in a well-known manner. The shaft 15 can carry a large or heavy flywheel means 16 as well as a clutch 17. This clutch can transmit driving force when engaged with a diesel or internal combustion engine means 18 in the event of failure of incoming electrical energization on utility lines 11, 12, and 13. The engine means 18 effects rotation of the clutch 17 as well as flywheel 16 and shaft 15 which carries a motor rotor and which also causes rotation of a generator rotor of generator means generally indicated by numeral 20 in a well-known manner. The generator means 20 has first, second and third lines indicated by numerals 21, 22 and 23, respectively, for supplying uninterrupted power to energize equipment requiring maintenance of a minimum frequency such as 58 cycles per second and also requiring proper power voltage control. A regulator means 24 for voltage control can be provided with suitably excited generator means 20 in a well-known manner. An example of a regulating system for alternators can be seen in Patent 3,072,840, Sones, issued January 8, 1963, to the assignee of the present invention.

Figure 2:
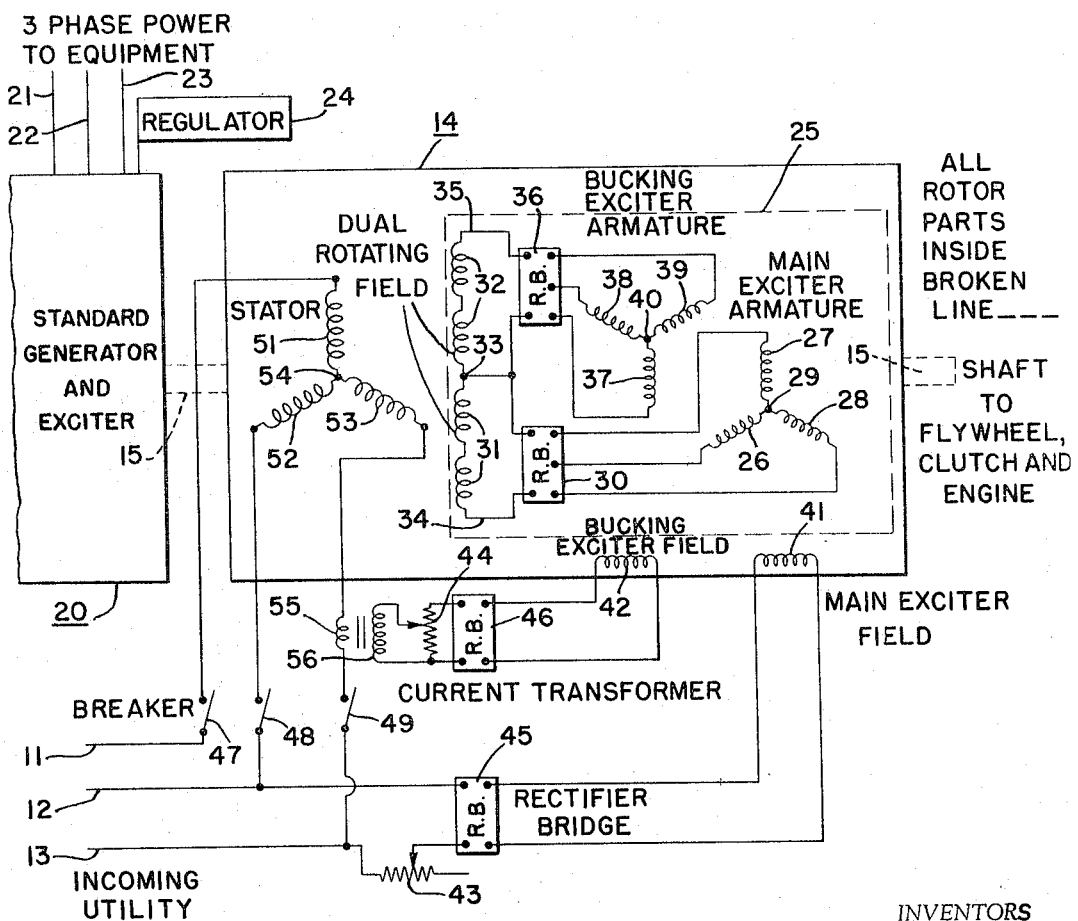
FIGURE 2 illustrates electrical circuitry embodying features for the dual exciter system in accordance with the present invention.

FIGURE 2 illustrates electrical circuitry of motor means 14 including particular parts or components of a rotor portion 25 thereof referring to a block within which all motor rotor parts are illustrated. The rotor 25 carries main exciter armature winding means 26, 27 and 28 joined at one to each other at a juncture 29 and at opposite free ends thereof to a rectifier bridge means 30. This rectifier bridge 30 supplies exciting power from the main armature winding means to a first field portion 31 of a dual rotating field also including a second rotating field portion 32 as illustrated in FIGURE 2. The first and second portions 31–32 of the dual rotating field can have a series connection to each other including a juncture 33. An opposite end of the first field portion 31 is connected by a lead or jumper 34 to the rectifier bridge means 30 and similarly a free end of the second field portion 32 is connected by a lead or jumper 35 to a further rectifier bridge means 36. The further rectifier bridge means 36 serves to transmit electrical energization from a "bucking" exciter armature winding means including coil portions 37, 38 and 39 and having a juncture 40 as to each other and free ends connected to the rectifier bridge means 36.

The motor means 14 includes fixed or field components also shown in FIGURE 2. Such field components are represented as a first or main exciter field winding means 41 as well as a second or "bucking" exciting field winding means 42 suitably fitted to stationary iron pole structures.

For variable energization of the main exciter field means 41 and "bucking" exciter or secondary field means 42, there can be provided external variable resistances or rheostat means 43 and 44 in series therewith for electrical power supply through rectifier bridge means 45 and 46, respectively. As can be seen in FIGURE 2, the first or main exciter field means 41 can thus be provided with electrical energization directly from the incoming utility lines 12 and 13 by way of the rectifier bridge means 45 and variable resistance rheostat means 43. Also shown in FIGURE 2 are relay or breaker switch means 47, 48 and 49 which, when closed, effect electrical energization of polyphase stator winding portions 51, 52 and 53 by connection to incoming utility lines 11, 12 and 13, respectively. These stator winding portions 51, 52 and 53 can have a central juncture 54 in a well-known manner. It is to be understood that the stator winding portions 51, 52 and 53 can each be divided into subcombinations or pairs to permit exchange of interconnections of individual portions for high and low voltage operation to be noted subsequently herein.

In accordance with the present invention, one of the supply connections, such as to the stator winding portion 53 by way of the breaker switch means 49, can be provided with a current transformer means, a primary portion 55 and a secondary portion 56 externally of the motor means 14. This current transformer means can have the secondary portion 56 thereof joined by suitable leads or jumpers to the rectifier bridge means 46 noted earlier for electrical energization of the "bucking" exciter field means 42. Physical aspects of the stator components, as well as the rotor components of the motor means 14, can be seen in further detail in views of FIGURES 3 and 4 of the drawings, while views of FIGURES 5 and 6 of the drawings provide further detail of the connection diagramming of the electrical circuitry basically shown in the view of FIGURE 2 of the drawings.

The motor means 14 structurally can be the same as a generator being used as a synchronous motor to drive another generator. In the system of FIGURE 1, generator means 20 supplies power and is driven by another alternator running as a synchronous motor means 14 from the utility power lines 11, 12 and 13 with shaft means 15 coupled together to the flywheel means 16. One problem encountered in the past with synchronous motor drivers was that of disconnecting from the line when the utility power fails, especially due to short circuit of incoming lines. In the one second or longer interval generally required to open a breaker means, the normally-excited synchronous driver would force large currents through such short-circuited utility supply lines such as 11, 12 and 13. This would absorb power from the flywheel means 16 resulting in excessive reduction of its speed. The frequency of the system could then drop below a fifty-eight cycle per second minimum specified.

During operation, in accordance with the present invention, the synchronous driver motor means 14 has the special feature of dual exciter fields 41 and 42 supplying a dual alternator winding means 26–27–28 and 37–38–39, respectively. The main exciter field means 41 supplies a more-than-adequate supply of current to the alternator or armature main exciter means 26–27–28 as long as the utility lines 11, 12 and 13 supply power by way of rectifier bridge means 45 to the main exciter field means 41. The second or "bucking" exciter field means 42 supplies an opposing flux-causing current to the other alternator exciting means 37–38–39. Excitation of the secondary or "bucking" exciter field means 42 is supplied by current transformer means 55–56 in one of the incoming utility lines. Normal full-load current results in supply of only a small amount of "bucking" current.

A larger short-circuit current, as noted previously during failure of the power line, would cause a larger increase in excitation to the field portion 42 of this second exciter means which would provide a larger "bucking" current to the field of the driver motor means almost instantaneously reducing flux thereof so that it would no longer generate currents back into power line. Thus, energy loss for generating those currents can be cut to a minimum, and the flywheel means 16 does not suffer the formerly-described loss of speed due to motor losses. As noted, physical arrangement of components of motor means 14 can be seen in views of FIGURES 3 and 4. The motor means 14 includes a suitable housing and end frame for journalling shaft 15 that carries rotor portion 25 having windings therewith as noted in FIGURE 2. The stator field means 51–52–53 are fitted to a magnetic core C secured to housing H and located radially outwardly in alignment with the rotor means 25. An auxiliary frame portion F has suitable fastening devices or bolts to hold magnetic cores on which the first or main exciter field means 41 and second or "bucking" exciter field means 42 are positioned radially outwardly from the main exciter winding means 26–27–28 and secondary or "bucking" exciter winding means 37–38–39 as can best be seen in the view of FIGURE 4.

Figure 3:
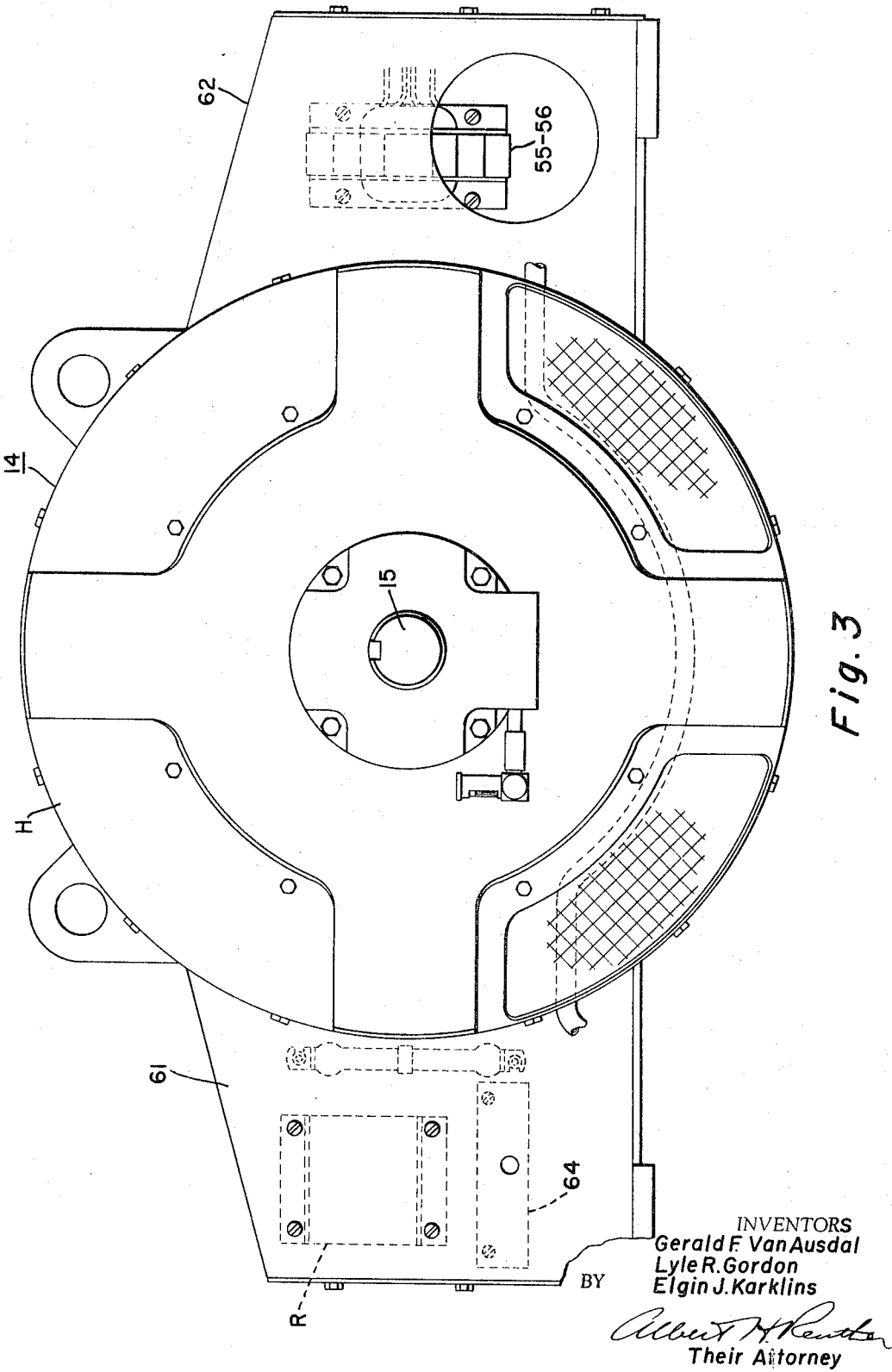
FIGURE 3 is an end view of a synchronous machine assembly to have dual exciter features in accordance with the present invention.
Figure 4:
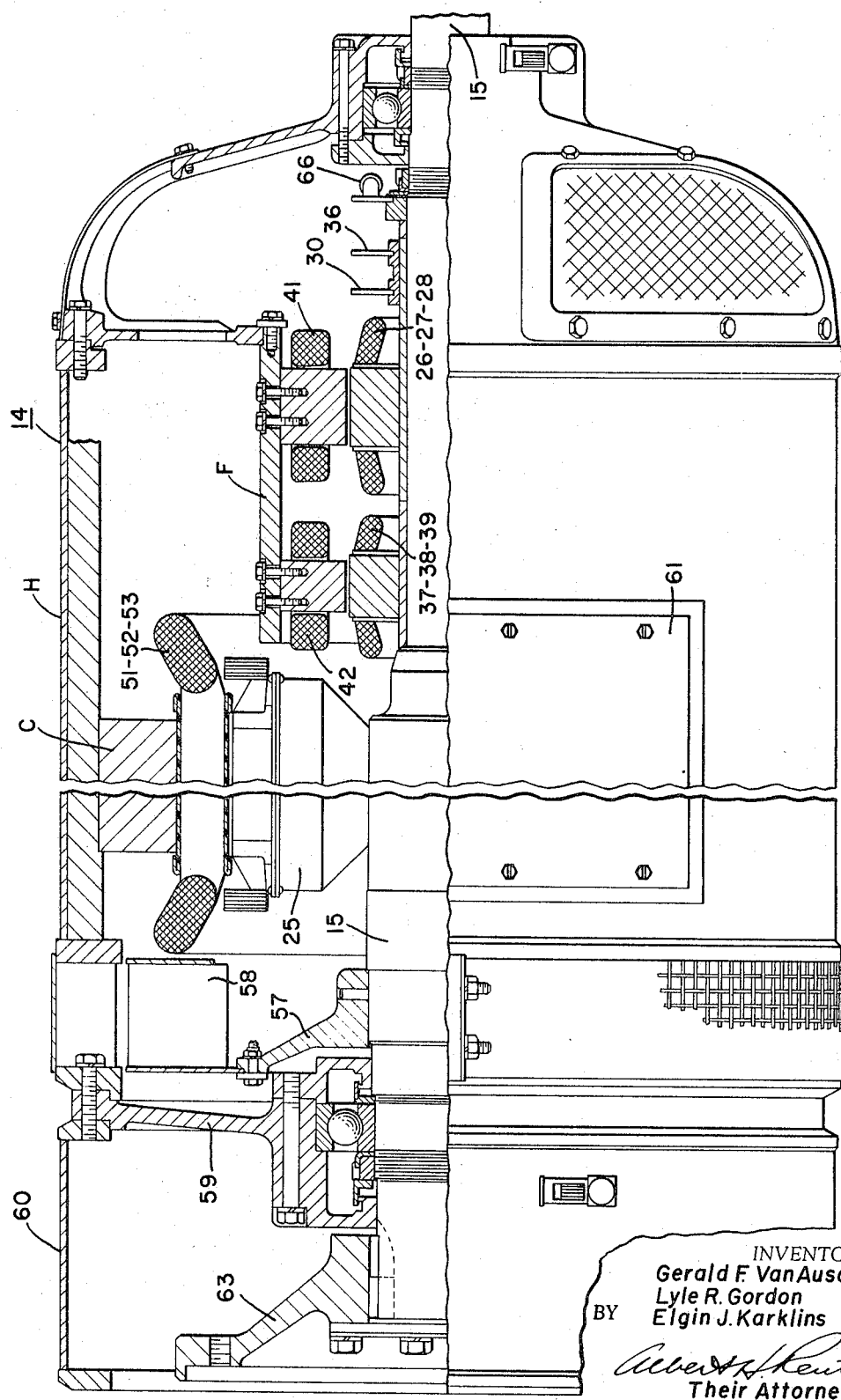
FIGURE 4 is a partially sectioned side view of the machine assembly of FIGURE 3.

The shaft 15 can also carry an annular support 57 for fan blade means 58 in a location adjacent to a journaling end frame 59 having a flywheel housing 60 carried therewith in a location radially outwardly from flywheel coupling means 63 shown specifically in the view of FIGURE 4. First and second laterally-extending housing projections 61 and 62 can be seen in FIGURE 3 and these are for mounting of rectifier assemblies and current transformer means, respectively. An outline of rectifier assembly indicated by a reference R in FIGURE 3 is provided as is an outline for current transformer means 55–56. A terminal board or block assembly 64 can also be seen in the view of FIGURE 3 and will be further noted subsequently herein.

Figure 5:
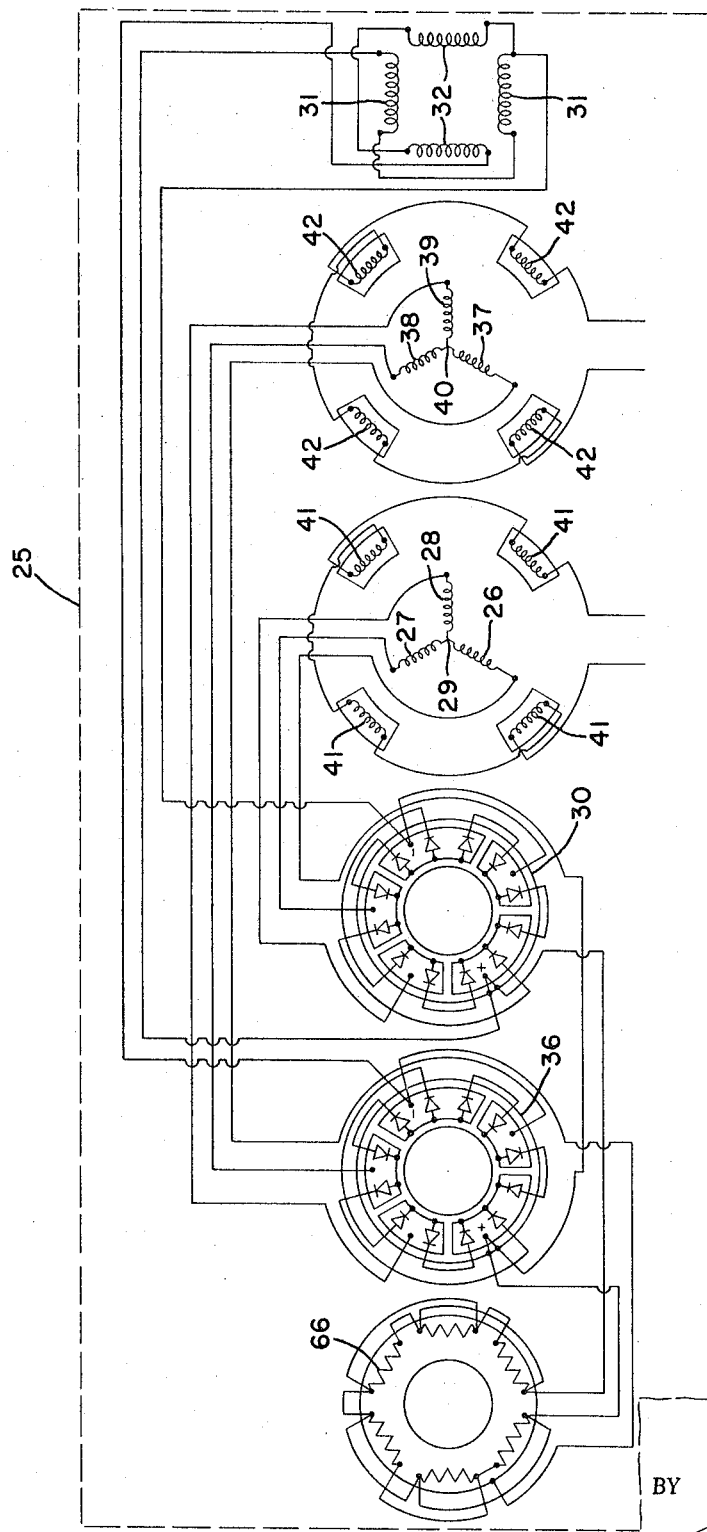
FIGURES 5 and 6 illustrate connection diagrams for the machine of FIGURES 3 and 4 to operate with circuitry of FIGURE 2 in accordance with the present invention.
Figure 6:
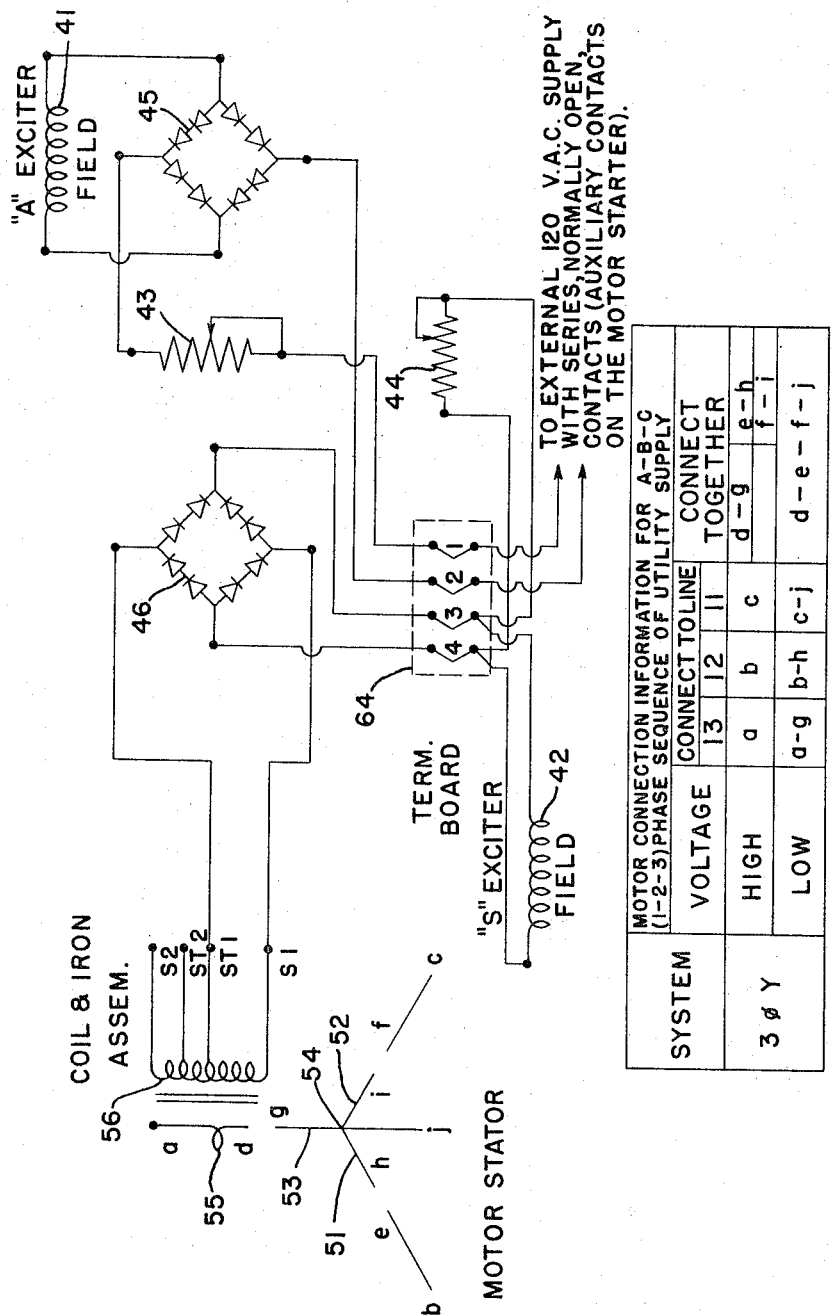

As a supplement for components and circuitry included for motor means 14 in FIGURE 2, reference can be made in FIGURE 5, as well as to FIGURE 6, wherein connection diagrams illustrate arrangement of rectifier bridge means 30 and 36 as well as 45 and 46, respectively. The rectifier bridge means 30 and 36 are mounted on the shaft 15 of rotor means 25 and an example of such rectifier assembly can be seen in the Patent 3,059,168, Sones et al., issued October 16, 1962, belonging to the assignee of the present invention. FIGURE 5 illustrates interconnection of all rotor parts shown in circuitry of FIGURE 2 plus provision of the resistance means 66 used with rectifier bridge portions 30 and 36 also carried by the shaft 15 in a physical location as indicated in FIGURE 4. In FIGURE 6 of the drawings there can be seen a stator connection diagram for the motor means 14. It is to be understood that the stator winding means 51–52–53, as shown in FIGURE 6 have been divided into pairs or dual portions for reversal of connection to obtain high and low voltage operating characteristics. These high and low voltage connections are indicated in an accompanying chart utilizing lower case letters a, b, c, d, e, f, g, h and i which appear in conjunction with the stator winding portions 51–52–53 in the view of FIGURE 6. It is to be noted that one section a–d of the stator winding portion 53 can serve a dual or additional purpose as the primary portion 55 of the transformer having the secondary portion 56 interconnected to rectifier bridge means 46 as indicated in FIGURE 2. For low-speed or low-voltage connection, there is an additional "neutral" lead j added to the common juncture 54 of the stator winding portions 51–52–53 and this is used for the connection as indicated in the accompanying chart. A lead end indicated by reference a is brought out of the housing H of the motor means stator assembly for high and low voltage operating connections.

It is to be understood that polyphase interconnections illustrated are of a Y type and that delta connections could also be used in conjunction with the dual exciter system of the present invention. As further protection, a high-low phase sentinel means and circuitry disclosed in the view of FIGURE 7 can be used for control of high and low voltage operating ranges in conjunction with the dual exciter system and equipment of the present invention. As an example, the voltage range termed "low" can be between 208 and 240 volts, while voltage range termed "high" can be between 416 and 480 volts. FIGURE 7 shows an alternator having windings 67–68–69 with a common or neutral connection 70 therewith as well as supply lines 71–72–73 respectively for first, second and third phases. Such high and low voltage operating ranges can be sensed in each of three phases or in only one thereof. Circuitry for each phase can be identical and therefore in FIGURE 7 a full showing thereof is provided only for the first phase and blocks are indicated in the second and third phase locations. Previously it was necessary to provide mechanically sensitive relay means whereas here a completely static and electronic sensing means protects equipment that is sensitive to voltage or frequency fluctuations. Corresponding high and low sensing or sentinel means with a particular phase can cause relay operation with positive action free of chattering of contacts at close voltage differential at exact selected voltage of high or low value. Maximum control occurs where all three phases are monitored for a predetermined range above and below rated voltage conditions. Each high and low portion of circuitry has potentiometer means 74H and 74L respectively as well as diode means 75H and 75L as indicated in detail in one phase shown in FIGURE 7. There are two Zener diodes 76H–77H and 76L–77L in each portion as well as silicon controlled rectifier means 78H and 78L respectively. A relay coil means 79H and 79L can be provided for each portion subject to energization to effect automatic diesel engine starting for example with or without time delay upon sensing of voltage variation beyond a predetermined high and low range. A bias is selected for the silicon controlled rectifier means 78H and 78L by manual adjustment of potentiometers 85H and 85L respectively. The Zener diode means 76H–77H and 76L–77L are biased in the negative Zener reference region so that under positive conditions the diode means conduct like any regular diode though as biasing is negative there is attained a point where voltage across the device remains constant regardless of the amount of current drawn. Hence the diode means can be maintained at a constant or reference voltage.

In actual operation the generator or alternator voltage is converted to D.-C. by diode means 75H and 75L. The forward current passing through these diodes is applied to the gate lead of the silicon controlled rectifier means to control supply of current capable of energizing the relay coil means in the high and low sentinel portions respectively. Once the relay is activated, its contacts can either close or open to either shut down the generator or switch to alternate power supply. The relay remains closed until a change is encountered to allow the Zener diode means 76H–77H or 76L–77L to return to their original reference voltage.

Resistance means 80H and 80L provide refinement or addition to basic circuitry noted so far in that there is thus provided a current path for the sentinel activation during the time that either silicon controlled rectifier means 78H or 78L is in an off condition. When either silicon controlled rectifier means is switched on, the resistance thereof and the relay coil means is so small in comparison to resistances of 80H and 80L that there is effectively a short circuiting of resistances 80H and 80L. Further improvement results from capacitor means 81H and 81L as well as diode means 82H and 82L shunted across relay coil means 79H and 79L respectively as shown in FIGURE 7 for minimizing relay response time. This permits "tuning" of the capacitor to relay frequency of operation in a resonant condition for the relay circuitry, for example, half-wave D.-C. frequency or 30 cycles per second.

Resistance means 83H and 83L as well as capacitance means 84H and 84L compensate for differences in thermal characteristics between individual Zener diodes. Thus Zener diode means 76H and 76L are rough sensing devices and Zener diodes means 77H and 77L are for fine tuning with the latter in practice being several Zener diodes in series for each high and low sentinel portion. Potentiometer means 85H and 85L are used for critical adjustment of the gate pulse for the silicon controlled rectifier means.

Thus there is provided a static sentinel means insensitive to mechanical vibration yet capable of "watching over" a specific power source in one or more phases wherein signalling is required for remedial action against deviations that occur above or below acceptable levels of voltage and/or frequency. The high-low phase sentinel means can trigger operation for proper starting accompanied by bringing on a supply line and automatic emergency standby power source, for complete shutdown of a power system by triggering main breaker action, for shutdown of heater banks, and for transfer of a "no-break" power system from electric motor to diesel or external combustion engine drive.

Instantaneous and positive action of the high-low sentinel means is assured by having no current flow present in relay coil means until specific pick-up voltage is reached and on drop-out the current is interrupted completely at specified voltage. Relay contact operation at undesired voltages and partial excitation problems can be avoided though voltage differential between pick-up and drop-out is 2 volts for example when the sentinel is used with relays. An accuracy of plus or minus one volt is attainable over a temperature operating range from 0° C. through 55° C.

The dual exciter (alternator field) design, one additive and one subtractive, also results in an improved starting action of the synchronous motor due to D.C. flux cancellation during starting. This aspect is normally not important when the synchronous motor is used in the "no-break" concept because the flywheel, synchronous motor and generator are accelerated to operating speed by a diesel engine or some other prime mover through a clutch. For more standard applications where the motor must start across the line (either full voltage or reduced voltage starting) this improved motor starting is very important and the dual excitation (opposing field) concept yields the following improvements in synchronous motor applications:

(a) The alternator field does not require shorting during starting.

(b) Conventional three-phase motor starting equipment (in lieu of synchronous motor starting equipment) can be used.

(c) Starting torque of 200% full load torque can be realized.

While the embodiments of the present invention as herein disclosed constitute preferred forms, it is to be understood that other forms might be adopted.

What is claimed is as follows:

1. A dual exciter system, comprising, a source of incoming lines, an internal combustion engine and clutch means for use in place of said source, a flywheel means, an output generator means to supply uninterrupted power to load equipment, a synchronous motor means, and shaft in location substantially radially in alignment with as well as said flywheel means and clutch with engine means, said motor means having a polyphase stator winding arrangement as well as a first main exciter field portion and a secondary bucking exciter field portion, polyphase main exciter armature winding means and secondary bucking exciter armature winding means on said shaft in location substantially radially in alignment with said first exciter field portion and said secondary bucking exciter field portion respectively, a dual rotating field means and corresponding rectifier bridge means for connection thereof to said main exciter armature means and secondary bucking exciter armature means, and a current transformer means having a primary portion in one of said polyphase stator supply lines and a secondary portion with corresponding rectifier bridge for transmitting electrical energization to said secondary bucking exciter field portion.

2. The system of claim 1 wherein one of said exciter armature winding means supplies more-than-adequate current to said dual rotating motor field means as long as said source is supplying power and the other of said exciter armature winding means under normal full-load current supplying only a small amount of bucking current though under supply line shorting conditions this bucking current increases almost instantaneously for motor flux reduction thereby minimizing generated current loss and reduction of speed of said flywheel means changeover from said source to said engine and clutch means for smooth continutaion of motive driving power and operation of said generator means.

3. The system of claim 1 wherein a variable shunt resistance means is provided between said secondary bucking exciter field portion and rectifier bridge means to said secondary portion of said current transformer means.

4. The system of claim 1 wherein said polyphase stator winding arrangement is Y-connected as are said main and bucking exciter armature winding means.

5. The system of claim 1 wherein said polyphase stator winding arrangement has pairs of alternately connectable segments in each phase for high and low voltage operation.

6. On an alternator means having a polyphase stator winding means normally energizable from an incoming supply line source which if short circuited is substituted for by a combustion engine means for use of a clutch and flywheel means to maintain constant power output of generator means driven thereby, an alternator excitation means adapted for coping with problems of reduction of flywheel speed and forcing of large currents through short-circuited supply lines, comprising, a main exciter field portion energized from the supply line source and physically fixed on the alternator means, a secondary bucking exciter field portion also physically fixed on the alternator means, current transformer means for transmitting energizing power from the supply line source to said secondary bucking exciter field portion, both main and bucking exciter armature winding portions corresponding in alignment with said main and secondary exciter field portions respectively, and dual rotating field means on the alternator means energized by said main and bucking exciter armature winding portions, one of said exciter field portions supplying more-than-adequate current to said dual rotating field means as long as said supply line source is properly functioning and the other of said exciter field portions under normal full-load current supplying only a small amount of bucking current which is increased sharply for flux reduction upon supply line source failure and thus minimizing energy loss for generation of short-circuit currents as well as avoiding loss of speed of flywheel means.

7. The excitation means of claim 6 wherein separate rectifier bridge means are provided between each of said dual rotating field means as well as between said current transformer means and said secondary bucking exciter field portion.

8. In combination with an alternator means having a three-phase stator winding Y connected and normally energizable from an incoming supply line source which if short-circuited is substituted for by a combustion engine means through use of a clutch and flywheel means to maintain constant power output of generator means driven thereby, an alternator excitation means adapted for coping with problems of reduction of flywheel speed and forcing of large currents through short-circuited supply lines comprising, a main exciter field portion energized from the supply line source and physically fixed on the alternator means, a secondary bucking exciter field portion also physically fixed on the alternator means, current transformer means for transmitting energizing power from the supply line source to said secondary bucking exciter field portion, both main and bucking exciter armature winding portions corresponding in alignment with said main and secondary field portions respectively, and dual rotating field means on the alternator means energized by said main and bucking exciter armature winding portions, one of said exciter field portions supplying more-than-adequate current to said dual rotating field means as long as said supply line source is properly functioning and the other of said exciter field portions under normal full-load current supplying only a small amount of bucking current which is increased sharply for flux reduction upon supply line source failure and thus minimizing energy loss for generation of short-circuit currents as well as avoiding loss of speed of flywheel means.

9. The excitation means of claim 8 wherein separate rectifier bridge means are provided between each of said dual rotating field means as well as between said current transformer means and said secondary bucking exciter field portion, said main and exciter field portions each having variable resistance means in series and in shunt respectively.

References Cited by the Examiner
UNITED STATES PATENTS
2,722,652  11/1955  Brainard _____ 322—64 X ORIS L. RADER, *Primary Examiner.*

G. SIMMONS, *Assistant Examiner.*